Dec. 14, 1954  E. R. FREDERICK  2,696,736
FABRIC TESTING MACHINE
Filed June 13, 1951  4 Sheets-Sheet 1

INVENTOR
Edward R. Frederick
BY
W. J. Eccleston
ATTORNEY

Dec. 14, 1954  E. R. FREDERICK  2,696,736
FABRIC TESTING MACHINE
Filed June 13, 1951  4 Sheets-Sheet 2
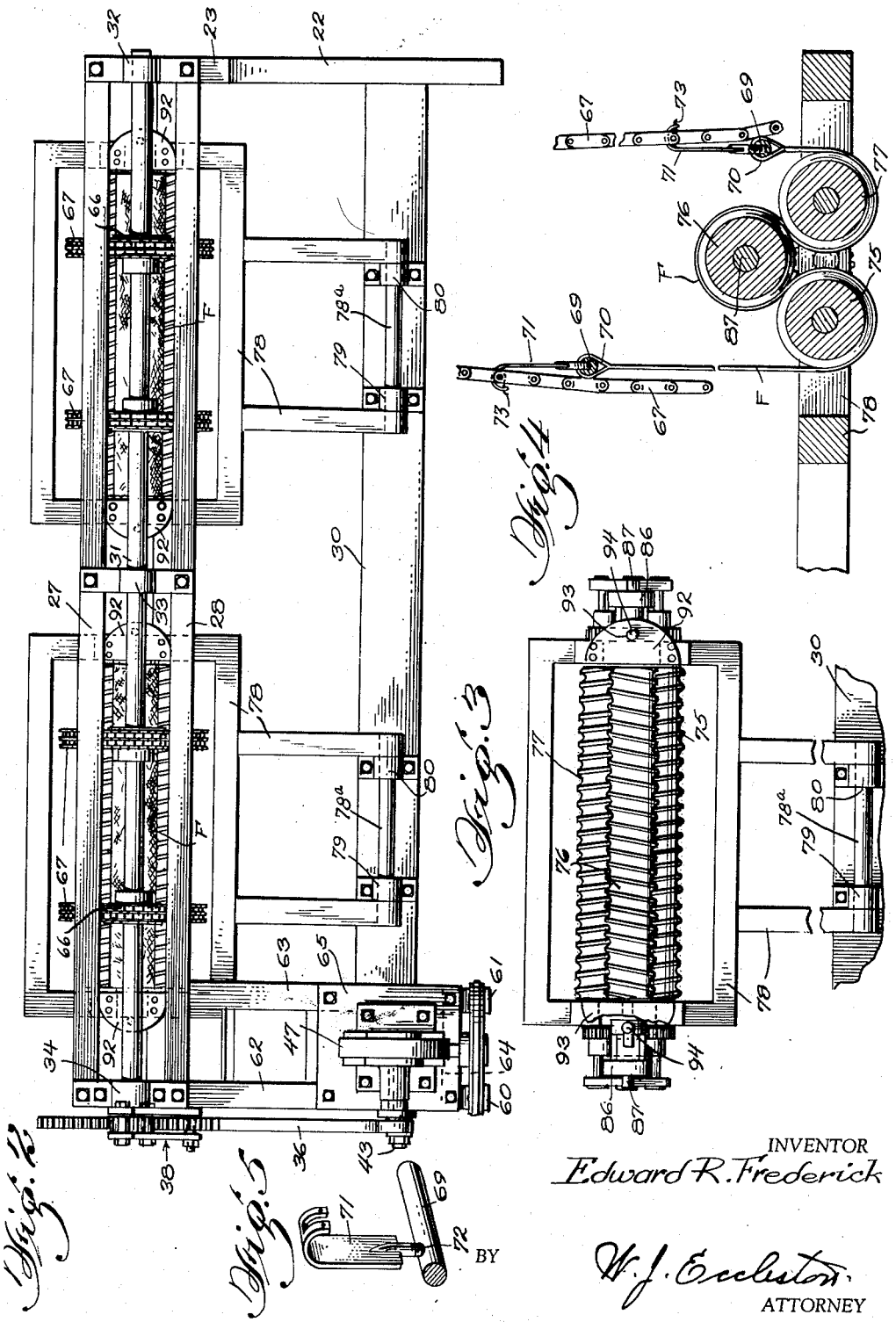
INVENTOR
Edward R. Frederick
BY
W. J. Eccleston
ATTORNEY Dec. 14, 1954   E. R. FREDERICK   2,696,736
FABRIC TESTING MACHINE
Filed June 13, 1951.   4 Sheets-Sheet 3
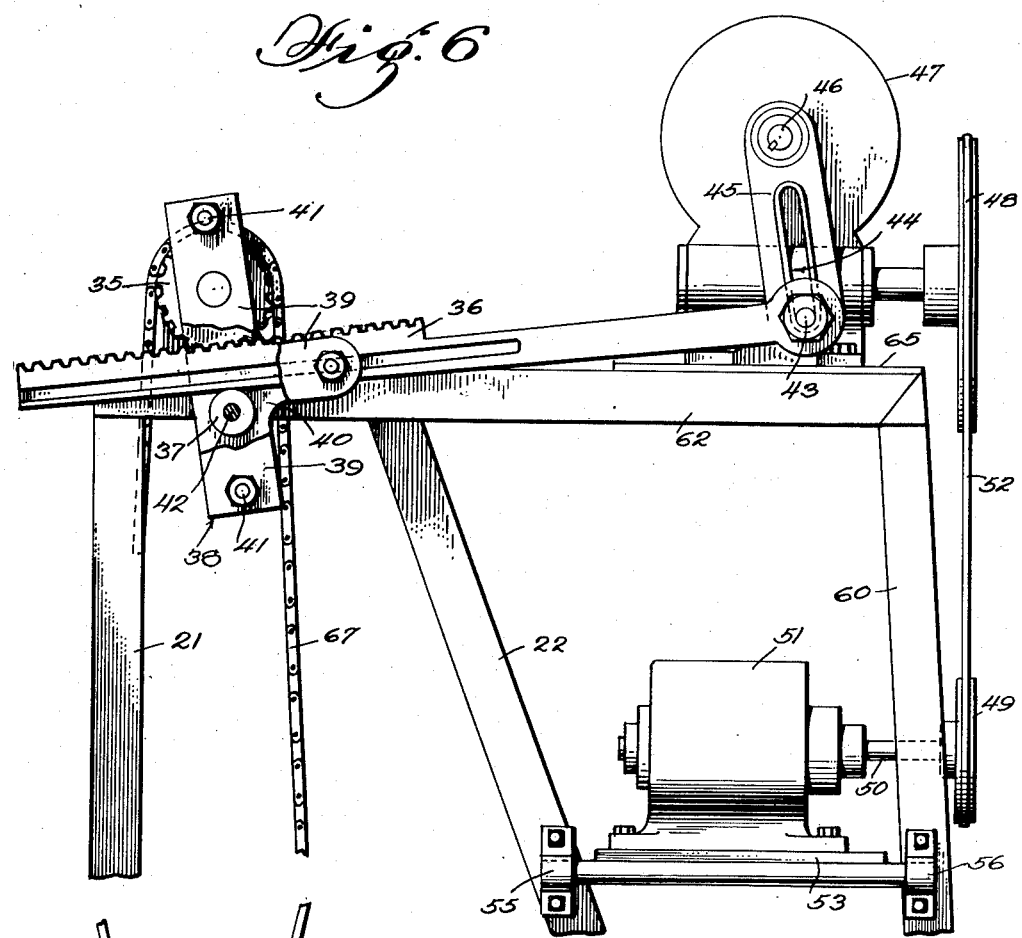
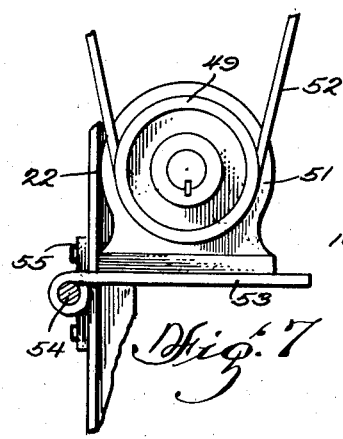
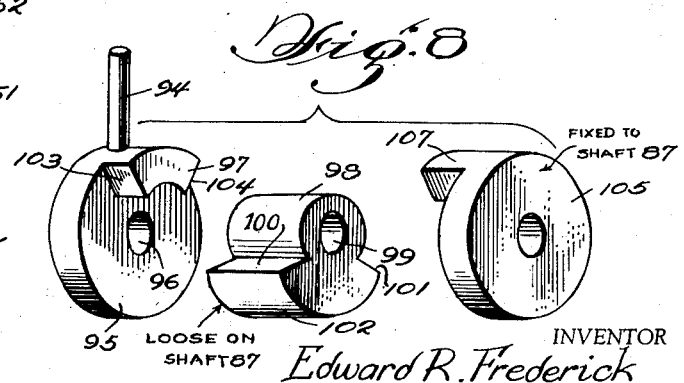
INVENTOR
Edward R. Frederick
BY
W. J. Eccleston
ATTORNEY Dec. 14, 1954  E. R. FREDERICK  2,696,736
FABRIC TESTING MACHINE
Filed June 13, 1951  4 Sheets-Sheet 4
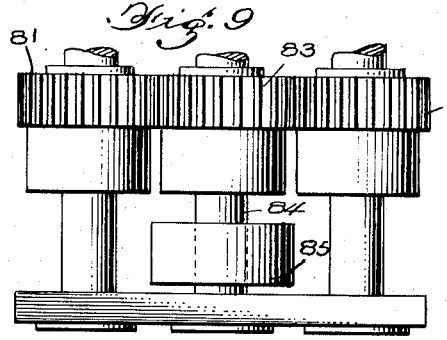
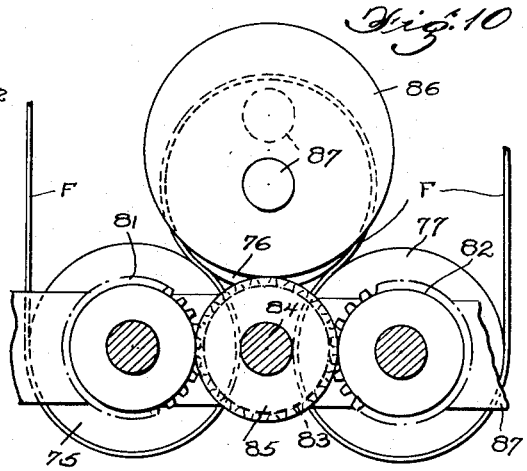
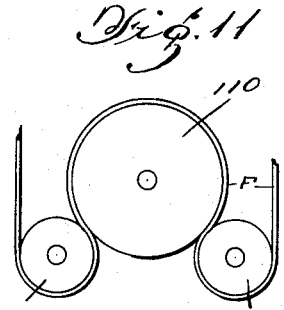
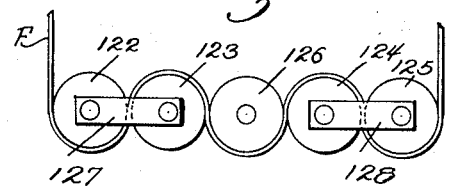
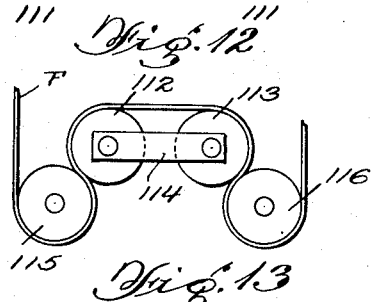
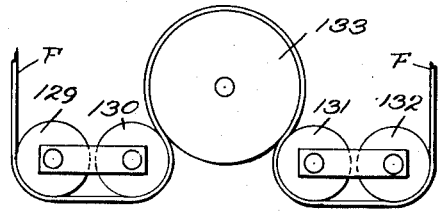
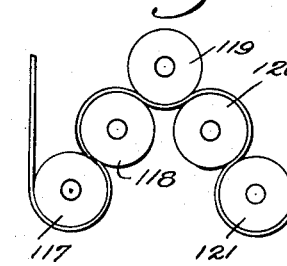
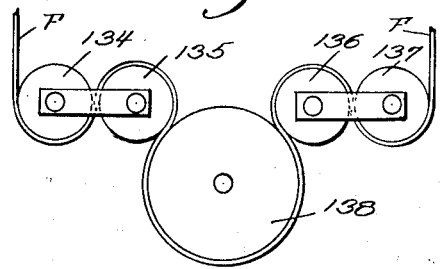
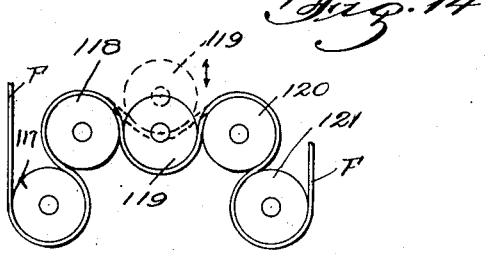
INVENTOR
Edward R. Frederick
BY
ATTORNEY United States Patent Office 2,696,736
Patented Dec. 14, 1954

2,696,736

FABRIC TESTING MACHINE

Edward R. Frederick, Pittsburgh, Pa., assignor to the United States of America as represented by the Secretary of the Army Application June 13, 1951, Serial No. 231,391

27 Claims. (Cl. 73—159)

The present invention relates to testing machines for testing the wearing qualities and strength of fabrics, especially textile fabrics. Among other objects, the invention aims to provide a machine of simple construction which will subject a strip of fabric to tension, flexing or bending, compression, shear, and rubbing or abrasion during each cycle of the machine. A further object is to make the machine readily adjustable so that the several stresses imposed on the fabric may be varied in kind and in intensity. Other objects will be apparent from the following description of the preferred embodiment of the invention taken in connection with the accompanying drawings forming a part of this specification.

In said drawings,

Fig. 2 is a top plan view of the same; parts being omitted for clearness;

Fig. 3 is a top plan view of the rolls and roll frame, the scale being larger than Figs. 1 and 2;

Fig. 4 is a vertical section through the rolls and roll frame with a test strip of fabric in position, the scale being larger than Fig. 3;

Fig. 5 is a detail in perspective showing one of the hook connections;

Fig. 6 is a fragmentary end elevation, the view being from the opposite end of Fig. 1, showing particularly the main shaft drive; parts being omitted for clearness;

Fig. 7 is a detail in sectional elevation showing the mounting of the driving motor;

Fig. 8 is a detail in perspective of part of the mechanism to control stoppage of one of the rolls engaged by the test strip of fabric;

Fig. 9 is another detail, in top plan, showing the roll gearing and associated parts;

Fig. 10 is another detail, in side elevation, showing one of the roll-elevating and lowering cams and cooperating parts; and Figs. 11–17 are diagrams showing other possible arrangements of rolls, which appear in end elevation.

Figure 1:
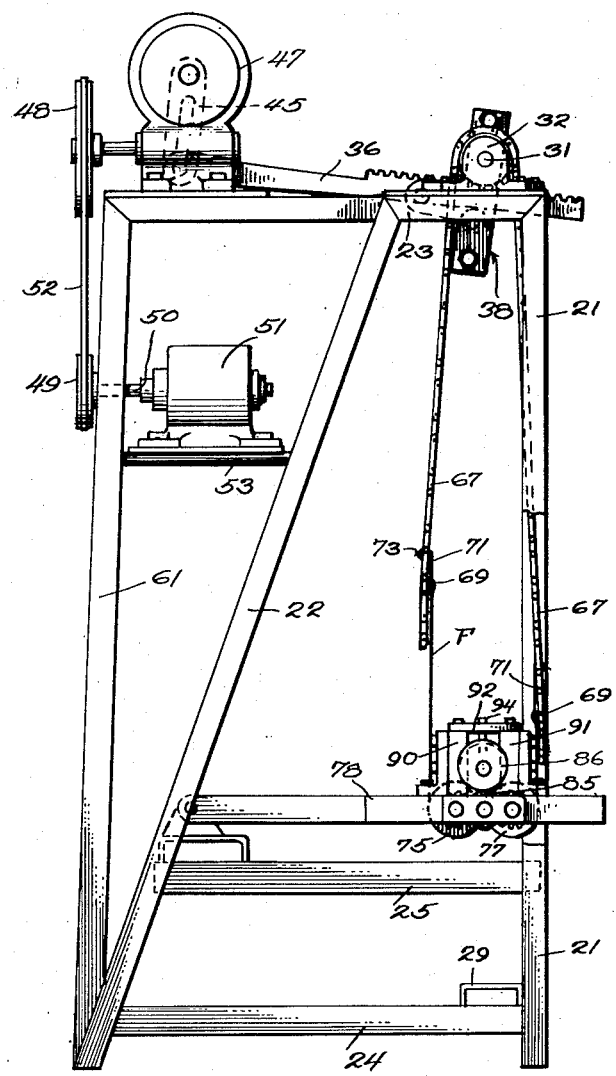
Fig. 1 is an end elevation of a machine embodying the invention, shown with a test strip of fabric.

Referring particularly to the drawings, the preferred machine has an upright, rigid and open main frame formed of welded steel shapes, including at each end a vertical angle bar 21, an inclined angle bar 22, a top horizontal angle 23 welded at its ends to bars 21 and 22, and horizontal cross bars 24, 25 also welded at their ends to angles 21, 22. The end structures composed of bars 21–25 inclusive might be termed A-frames which are joined by a horizontal angle iron 26 near the bottom and by a pair of parallel, horizontal angle bars 27, 28 at the top. Furthermore, a horizontal channel 29 is welded at its ends to the two cross bars 24 and extends the length of the machine, while a second horizontal, longitudinally extending channel 30 is welded at its ends to the two cross bars 25; this second channel is wider and heavier than channel 29 as it is used to provide a pivot support for two or more heavy swinging frames carrying rolls about which the fabrics under test are wrapped, as will be explained. The described main frame may stand about 54 in. above the floor and need not be over 30 in. wide at the floor and 74 in. long. An auxiliary frame, to be described, is secured at any convenient point on the main frame to support the driving mechanism for the main shaft.

Main shaft drive and auxiliary frame

The main shaft 31 extends horizontally along the top of the main frame, being carried by at least three shaft bearings 32, 33, 34 fixed upon the top angle bars 27, 28. One end of the shaft extends beyond the end bearing 34 and carries a pinion 35 which meshes with teeth on a reciprocating rack 36 supported by a roller 37 in turn carried on a rocking cradle 38 hanging from the shaft. The cradle 38 may include two parallel plates 39, 40 secured together by tie bolts 41, and the roller 37 has a shaft 42 journaled in the plates 39, 40. Thus the rack as it reciprocates and rocks is kept in mesh with the pinion. The opposite end of the rack is adjustably connected by a bolt 43 in the slot 44 of a slotted rotating link or arm 45 fixed to the power take-off shaft 46 of a speed reducer 47 fixed on top of the auxiliary frame to be described. This speed reducer may have a ratio of 33:1, and its drive or in-put shaft is driven preferably by a large V-belt pulley 48, a small pulley 49 fixed to a shaft 50 of an electric motor 51, and a V-belt 52 trained around pulleys 48 and 49. Motor 51 may be of one-half horsepower and its base is preferably bolted to a substantially horizontal swingable plate 53 welded at one end to a horizontal rockshaft 54 which rocks in bearings 55, 56 fixed on the machine frame. As the motor-supporting plate 53 is supported only at one end, part of its weight plus that of the motor is imposed on the V-belt, thus maintaining a uniform tension on said belt at all times.

The auxiliary frame, which may be secured temporarily or permanently to the main frame, includes a pair of nearly vertical bars 60, 61 tied together by a cross brace, not shown, and having their lower ends resting on the floor. At their upper ends angle bars 60, 61 are secured to and support the outer end of a horizontal U-shaped or three-sided base structure consisting of joined angle bars 62, 63, 64. The speed reducer 47 has its base bolted to a flat plate 65 welded or otherwise secured on top of this three-sided base structure. Directly below the speed reducer is the motor 51, and the rockshaft 54 has one bearing 55 fixed to the inclined angle bar 22 of the main frame and its other bearing 56 fixed to the nearly vertical angle bar 60 of the auxiliary frame. Obviously if another type of main shaft drive is employed, the auxiliary frame may be differently located with respect to the main frame and may have a very different form.

By the described motor drive, the main shaft 31 is rotated a number of turns in one direction, then stops momentarily and is rotated the same number of turns in the opposite direction, and so on. Fixed to shaft 31 are a plurality of double sprockets 66 and a double sprocket chain 67 meshes with each double sprocket and extends downwardly to a connection with the fabric F to be tested. These sprocket chains preferably are motorcycle chains, because of their known high efficiency and long life; however, for convenience of illustration, the chains are shown more or less diagrammatically. Preferably there are two connected to both ends of each test fabric, but in the event a narrow fabric strip is to be tested, only one chain need be used. Each connection preferably employs a steel rod 69 passed through the hem 70 at one end of the fabric F, a two-pronged hook 71 having screw threads 72 at its lower end coupling it removably to the rod, the prong ends of each hook being passed through the openings between links of the double sprocket chain. Adjustment for the varying lengths of the test fabrics is thus obtainable by merely inserting the prongs of the hooks in different openings, and if the fabric specimen stretches excessively during the test, new openings higher up on the chains may be engaged by the hooks. The operator will try to connect the fabric so that when it is under tension, the pivoted frame 78 (to be described) is horizontal. A cotter pin or a bent wire lock 73 may be passed through a small hole drilled in at least one prong of each hook to lock the hook on the sprocket chain, yet permit manual disconnection. Ordinarily, however, the fabric tension is amply sufficient to keep the hook prongs safely engaged with the sprocket chains.

Fabric rolls and frame

Each strip of fabric to be tested is wrapped or trained around three preferably corrugated rolls 75, 76, 77 all rotatably mounted on a heavy, pivoted, substantially horizontal frame 78 whose pivoted end swings about a horizontal axis provided by a shaft 78a and a pair of bearing members 79, 80 fixed on top of the channel 30, said axis being parallel to the main shaft 31. The roll-supporting frame 78 may be swung upwardly, by hand or otherwise, when it is desired to disengage a fabric specimen from the sprocket chains; and when no fabric is in testing position, the frame may be temporarily supported on a block (not shown) or it may hang down. Rolls 75, 76, 77 are preferably of solid hardwood, with axial metal shafts fixed to the hardwood bodies and rotatably supported in bearings, and while the top roll 76 could be larger in diameter than the other two, preferably the three rolls are of the same diameter (three inches overall) and of the same length. Whether of the same or different sizes, the rolls are each corrugated or threaded with coarse, rounded threads; preferably these threads are double, with a two inch pitch, which puts corresponding points on two adjacent threads one inch apart longitudinally of the roll. Rounded threads are important to obviate a tendency to cut the fabrics being tested. The threads on top roll 76 normally fit into the depressions or bottoms of the threads on the other two rolls 75, 77; or expressing the matter otherwise, the top roll meshes with the lower rolls except when lifted out of mesh as will be described. Preferably the top roll cannot completely mesh with the lower rolls, but is held spaced so that the bottoms of its threads are about one-eighth inch from the tops of the threads of the lower rolls when it is in lowermost position, so that there will not be excessive difficulty in flexing heavy fabrics, e. g., quilted or pile fabrics.

Starting with hem 70 at one end of the fabric, the latter is passed down around a lower roll 75, then up between rolls 75 and 76 and over roll 76, and down between rolls 76 and 77, then below roll 77, and up to the other hem 70. As frame 78 is heavy, weighing up to 100 lbs. or more, it imposes a constant and considerable tension on the fabric, which tends to hold the rolls in mesh. A spring scales (not shown) may be used to measure such tension prior to setting up the machine for the test. The tension of the fabric also pulls the upper roll downwardly to cause it to press the fabric into the sides and bottoms of the threads. This effects a shearing action as well as compression on the fabric, especially as the fabric tends to travel lengthwise of the rolls when in mesh and rotating; this shearing action arises because of the pressure of the threads of the upper roll 76 transmitted through the fabric alternately against opposite sides of the threads of the two lower rolls 75, 77 as the upper roll rotates in opposite directions. Also the upper roll is stationary at one period of the cycle while the lower rolls are still rotating. The fabric can not move longitudinally of the rolls because of its tension and is subjected to the action of the threads which travel longitudinally of the rolls as the rolls rotate. This longitudinal travel is in opposite directions, considering the top roll and either bottom roll, because the top roll has its threads opposite to the threads of either bottom roll.

Roll elevating and lowering mechanism

As the fabric is reciprocated by the alternating upward pull of the sprocket chains 67, the three rolls 75, 76, 77 are frictionally driven by the fabric, first in one direction, then in the other. To insure that the two lower rolls 75, 77 turn at the same time with the same velocity, in the direction imposed by the fabric, the shafts of rolls 75 and 77 at each end carry gears 81, 82 respectively, with an intermediate gear 83 meshing with gears 81 and 82 and driving a short shaft 84 which is rotatable on frame 78. On each shaft 84 a circular disk 85 is fixed so as to lie in a vertical plane. An eccentric or cam 86 is fixed to each end of shaft 87 of the upper roll 76; these eccentrics or cams have edge contact with the circular disks 85, which rotate with the lower rolls 75, 77 at the same angular velocity. When disks 85 rotate, wear is reduced on cams 86 because rolling contact creates less friction than sliding contact. Cams 86 are provided to lift the upper roll 76 preferably about one-half an inch twice during each cycle, which puts the rolls out of mesh. A roll-stopping or braking mechanism, to be described, is interposed between the shaft 87 of the upper roll and the synchronously rotated shafts of the two lower rolls to effect stoppage of rotation of the upper roll after about one-quarter of the cycle, followed by rotation of the upper roll in the opposite direction for about one-quarter of the cycle, then a full stop, then rotation in the original direction followed by full stop, and so on. This roll-stopping or braking mechanism is synchronized with the cams 86 so that said cams lift the upper roll during the part of each cycle the upper roll is being rotated and the lift continues until the roll stops and is reversed; the lift recurring when the roll in its reverse rotation again nears its stopped position. In a few words, the top roll is rotated in one direction, lifted and stopped, lowered and rotated in the opposite direction, lifted and stopped, lowered and rotated in the first-mentioned direction, and so on. The purpose is to combine an abrasion or wearing action on the fabric with the tension, compression and shear imposed by the rolls and the heavy frame 78. This statement will be clearer when it is recalled that during operation of the machine the fabric is being continuously reciprocated, so that whenever the upper roll is stopped, the tensioned fabric continues to slide over it to effect abrasion. This rubbing of the fabric occurs twice during each cycle, but only when the fabric is free from compression and shear.

Roll-stopping mechanism

Each end of shaft 87 projects between two spaced, vertical bearing guides 90, 91 fixed to and upstanding from the frame 78. Self-aligning bearings (not shown) are provided on both ends of shaft 87 to ride in the opposed faces of the bearing guides 90, 91 forming a slide bearing. A plate 92 is secured in a horizontal position to the tops of each pair of bearing guides 90, 91 and has an aperture 93 for slidably receiving a vertical pin 94 whose lower end is secured to a circular stop member 95 having a central bore 96 so that it surrounds but is loose on shaft 87. The stop members 95 are prevented from rotating because of the engagement of their pins 94 in apertures 93 of fixed plates 92. The upper roll cannot move out of the guides 90, 91 because the plates 92 at its opposite ends will prevent this. An arcuate dog 97 is integral with the stop member and projects outwardly at the top thereof and on the side toward the end of shaft 87. Dog 97 is preferably symmetrically disposed relative to the vertical plane which passes through the axis of shaft 87. Also loose on shaft 87 is a dove-tail clutch member 98 having a bore 99 to permit it to turn with or be stationary relative to said shaft. The dove-tail clutch member is so designed as to fit under dog 97, and the opposite faces 100, 101 of the dove-tail portion 102 are adapted to strike the opposite end faces 103, 104 respectively of the arcuate dog 97, wherever the dove-tail clutch member is rotated in opposite directions. A cylindrical driving member 105 is fixed as by a set screw to shaft 87 and it has an arcuate dog 107 integral therewith and projecting toward the stop member 95, the dove-tail clutch member 98 also fitting under dog 107. Shaft 87, being fixed to the upper roll, is oscillated in opposite directions as the roll itself is permitted to turn responsive to the frictional drive of the reciprocating test fabric; therefore driving member 105 oscillates in opposite directions, thus causing its dog 107 to strike face 100 (let us say) of the dove-tail clutch member, causing the latter to move with it until face 101 strikes end face 104 of stationary dog 97. Then shaft 87 comes to an abrupt stop, which stops the upper roll. The upper roll remains motionless to the end of the half cycle, that is, for one revolution of the two lower rolls; then the main shaft reverses, causing the three rolls to start turning with the tensioned fabric in the corresponding direction. The instant the upper roll starts to turn in the opposite direction, the driving member 105 moves in that direction and the dove-tail clutch member swings so as to assume its position of equilibrium. As the driving member 105 continues to turn, its dog 107 will strike face 101 of the dove-tail clutch member and cause the latter to move with it until face 100 strikes end face 103 of the stationary dog 97, when the shaft 87 is again brought to an abrupt stop, stopping the upper roll; and as before, the stopped upper roll remains motionless to the end of the half cycle. It will be clear that the described mechanism combines the functions of a clutch, a lost-motion mechanism and a brake.

The end faces on each driving member 105 and the end faces on each stationary dog 97 may in each case subtend angles of 60°, or one-sixth of a revolution, in which event the dove-tail end faces 100, 101 of the clutch member may subtend an angle of 120°. Such an arrangement would mean that the driving members 105 will rotate one full revolution in one direction, stop, then will rotate one full revolution in the opposite direction and again stop, and so on. At each stop the shaft 87 on which the driving members 105 are fixed will be elevated one-half inch or any other desirable distance, separating the upper roll from the two lower rolls as already explained.

*Modifications and general remarks*

A conventional counting mechanism (not shown) operated through the main shaft drive may be placed on the machine frame to record the number of cycles to which each test strip of fabric has been subjected by the machine, and with its aid, the operators may obtain comparative data on the wear resistance of numerous fabrics. It can be stated that the machine of the invention has tested 150 fabric samples, and has operated over three million cycles.

Many different adjustments and changes may be made in the described machine to accommodate it to different test specimens or different conditions. Thus the length of the "stroke" of the fabric may be changed by slight modification or adjustment of the main shaft drive. Instead of sprocket chains, cables or other flexible members may connect the ends of the fabric with the main drive shaft. The cams may be replaced by others having more throw or less throw. As different fabrics should be subjected to different tensions, the roll supporting frame may be made heavier by merely attaching weights to its free end, or if a temporary decrease in tension is desired, as for a particular series of tests, the free end of the roll-supporting frame may be partially supported by one or more tension coil springs secured at opposite ends to the machine frame and the roll-supporting frame; or the described roll-supporting frame may be removed and one of less weight may replace it. Also the described rolls may be replaced by rolls having a different form to give a greater shearing effect or no shear at all. Furthermore, the number of rolls may exceed three, and the rolls may be quite differently disposed relative to each other, as required by the exigencies of the test.

Figs. 11–17 show diagrammatically a few alternative arrangements of rolls which may be a part of the machine of the invention. In Fig. 11, the arrangement is the same as in Figs. 1, 3 and 4 except that the upper vertically movable roll 110 is about twice the diameter of the two lower rolls 111. In Fig. 12, four rolls of equal diameter are shown, the two upper rolls 112, 113 being spaced apart and having their shafts linked together as at 114 so that they will not separate from or approach each other when moved vertically. As shown, the upper rolls 112, 113 may move a little closer to the lower rolls 115, 116 to subject the fabric F to compression and to shear. The upper rolls will both be stopped at the same instant to cause the fabric to rub against them to effect abrasion. Fig. 13 shows an arrangement of five rolls 117, 118, 119, 120, 121, in a stepped arrangement, with the uppermost roll 119 vertically movable; or if preferred, the three upper rolls 118, 119, 120 may be linked together to move vertically as a unit relative to the non-traveling lower rolls 117, 121. The arrangement of Fig. 14 is like that of Fig. 13 except that the upper roll 119 may move down until it is on a level with the intermediate rolls 118, 120, the latter being spaced far enough apart to permit this. Fig. 15 illustrates a one-level disposition of five rolls, wherein rolls 122 and 123 are non-traveling, and rolls 124 and 125 at the other side are likewise non-traveling, while the central roll 126 is vertically movable by cams or the like as previously described. The two sets of non-traveling rolls are shown linked together by links 127, 128 to obviate relative movement, i. e., approach or separation; however, the rolls of each set may be adjustable by means of a set screw acting on a slide bearing, or by equivalent means, to effect adjustment of the compression and shear on the fabric passed between the rolls of each set. This will be understood without illustration. In Fig. 16 there are two sets of lower rolls 129, 130 and 131, 132 which are non-traveling, and an upper roll 133 which is vertically movable and has a diameter about twice that of the lower rolls. Fig. 17 shows the reverse arrangement wherein the two sets of non-traveling rolls 134, 135 and 136, 137 are above the vertically movable roll 138. The latter is shown as substantially twice the diameter of the non-traveling rolls but could be of the same diameter. Obviously these arrangements by no means exhaust the possibilities and other dispositions of rolls may be used. Springs, weights or mechanical means may be used to apply or augment the compression between the several meshing or contacting rolls of a set, and such compression may be constant or variable during each cycle. While the diagrams do not show it, all the rolls of Figs. 11–17 are preferably corrugated or threaded as described in connection with Figs. 3 and 4; however, if no shearing stresses are desired, all said rolls may be cylindrical to impose merely tension, compression and abrasion on the test strips.

I am aware that it is old to test ropes by flexing them while under constant tension, and to flex leather shoe soles by automatic machinery. Also, abrasion by a continuous rubbing action has been effected by various types of test machines. However, so far as I am aware, no one has provided a machine which will automatically flex a strip of fabric under tension, and will subject such a strip to shear, compression and abrasion during each cycle. The machine of the invention will be useful not only for testing the wearing qualities of textile fabrics but could be used in testing leather, rubber, plastics, laminates, and other flexible fabrics including certain types of metallic fabrics.

What I claim is:

1. A machine for testing flexible fabrics comprising automatic fabric-tensioning means, power-operated fabric-reciprocating means for moving the fabric relative to the fabric-tensioning means, fabric-compressing means, and means forming part of the fabric-compressing means for subjecting the fabric to shearing stresses while under compression and tension.

2. A machine for testing flexible fabrics comprising automatic fabric-tensioning and flexing means, power-operated fabric-reciprocating means co-operating with the fabric-tensioning and flexing means, and automatically acting means for subjecting the tensioned fabric to rubbing or abrasion during only part of each stroke of each reciprocation.

3. A machine for testing flexible fabrics comprising automatic fabric-tensioning means, power-operated fabric-reciprocating means co-operating with the fabric-tensioning means, fabric-compressing means, automatically acting means for subjecting the tensioned fabric during part only of each stroke of each reciprocation to rubbing or abrasion, and automatic means for shifting the position of the fabric-compressing means so that the fabric is relieved of compressive stresses during the period that rubbing or abrasion occurs.

4. The invention defined in claim 3, wherein there are also means for subjecting the fabric to shearing stresses concomitantly with the compressive stresses, said last-named means forming a part of the fabric-compressing means.

5. A machine for testing textile fabrics and the like comprising a set of rotary rolls some of which are substantially in contact and between and over which a specimen of the fabric may be trained, means to hold the rolls in operative relationship, means for imposing tension on the fabric specimen when so trained, power means for alternately pulling the opposite ends of the fabric specimen when so trained so that various portions of the fabric specimen travel over the rolls during each cycle of the machine, and means actuated intermittently by power derived from the fabric specimen itself to effect separation of one of the rolls relative to the others during each cycle of the machine.

6. The invention defined in claim 5, wherein automatic means is provided to stop rotation of the roll which is separated after such rotation has continued for a fraction of the cycle, said stop means operating to stop such rotation in either direction, so that the fabric is subjected to abrasion by its movement under tension around the stopped roll.

7. A machine for testing textile fabrics and the like, including a machine frame, a shaft supported on the machine frame, power means to rotate the shaft alternately in opposite directions, a roll support movably mounted on the frame, a plurality of fabric-engaging rolls on the roll support, the roll support being adapted to move toward or away from the shaft, means mounting the roll support so as to tend constantly to move away from the shaft, and flexible means passed about the shaft and driven thereby and adapted to support a piece of fabric when attached to its ends, with the intermediate portion of the fabric passed around the rolls.

8. The invention defined in claim 7, wherein the shaft extends horizontally, and the roll support is pivoted at one end to the frame to swing about a horizontal axis and is sufficiently heavy, with its rolls, to impose the desired tension on the fabric solely by the action of gravity.

9. The invention defined in claim 7, wherein there are three rolls so arranged that two of them are parallel, while the third roll has its axis offset relative to the plane of the axes of the first two rolls but parallel thereto and midway between said axes; all three rolls having corrugations or threads directly contacting the fabric and the first two rolls being supported out of mesh with each other but each being substantially in mesh with the third roll with the fabric lying between.

10. The invention defined in claim 7, wherein the three rolls are arranged so that two of them are parallel; gears are provided to connect said two rolls so that they rotate at the same speed in the same direction; the third roll has its axis offset relative to the plane of the axes of the first two rolls but is parallel thereto and midway between said axes; slide bearings provided on the roll support for the third roll permitting it to move toward the shaft and away from the first two rolls or away from the shaft and into substantial contact with the first two rolls; and automatic means actuated by movement of the fabric to force the third roll away from the first two during each cycle of the machine; the fabric tension restoring the third roll to its position of substantial contact when said last-named means is inactive.

11. A machine for testing textile fabrics and the like including a roll support, a plurality of rolls separably mounted on the roll support for flexing and simultaneously compressing a fabric specimen trained about the rolls, power-actuated means secured to the ends of the fabric specimen and adapted to reciprocate the fabric specimen trained about the rolls, the roll support and rolls together imposing tension on the fabric specimen when so secured, the rolls each having fabric-shearing surfaces directly pressed against the fabric specimen during the testing.

12. The invention defined in claim 11, wherein there is a machine frame, and the roll support comprises a relatively heavy frame pivoted at one end on the machine frame and carrying the plural roll means, the power-actuated means being above said pivoted frame.

13. A machine for testing textile fabrics and the like including a machine frame; a roll support pivoted on the machine frame; a plurality of rolls mounted on the roll support so as to be rotatable; power-actuated means adapted to be secured to opposite ends of a fabric specimen which is trained about said rolls and adapted to reciprocate said fabric specimen; the rolls and roll support by their combined weight imposing tension on the fabric specimen so secured; said rolls comprising a pair of lower rolls which are spaced apart and have parallel axes of rotation, and an upper roll; slide bearings secured to the pivoted roll support to support and guide the upper roll so that it may be moved toward and from the lower rolls; all three rolls being corrugated or threaded and the threads of the upper roll being opposite to and adapted to mesh with the threads of both lower rolls when the upper roll is in its lowermost position; the tension of the fabric imposed by the weight of the rolls and roll support tending to move the upper roll toward the two lower rolls at all times to compress the fabric between the upper roll and the two lower rolls; said threads constituting fabric-shearing surfaces directly pressed against the fabric when the upper roll is lowermost; and means driven by the lower rolls (which in turn are driven in opposite directions by the reciprocating fabric) for effecting automatic rise and fall of the upper roll during each cycle of the machine.

14. A machine for testing textile fabrics and the like including a machine frame; a roll support movably mounted on the machine frame; a plurality of rolls rotatably mounted on the roll support; power-actuated means adapted to be secured to opposite ends of a fabric specimen that is trained about said rolls and also adapted to reciprocate said fabric specimen, with the specimen under constant tension due to the weight of the movable roll support and said rolls; said rolls including three rolls each having rounded threads, two of the rolls being lower rolls which are spaced apart, a third roll being an upper roll whose threads are substantially meshable with the threads of the two lower rolls, said meshing threads constituting fabric-shearing surfaces; means to mount the third roll so that it moves into and out of substantial meshing engagement with the two lower rolls during each cycle of the machine; and mechanism operatively connecting the two lower rolls so that they must be rotated synchronously in the same direction by frictional driving engagement with the reciprocating fabric specimen.

15. A machine for testing textile fabrics and the like including power-actuated means secured to the opposite ends of the fabric specimen and adapted to reciprocate the same by pulls on said ends, a roll support; roll means on said roll support about which the intermediate portion of the fabric specimen is trained, said roll means being driven by frictional contact with the fabric; tension being imposed on the fabric by the weight of the roll support and rolls; said roll means comprising three corrugated or threaded rolls having parallel axes, two of the rolls being connected by gears to rotate at the same speed in the same direction, the third roll being offset relative to the other two rolls and being slidably mounted so as to move toward and away from the other two rolls and substantially meshing with the other two rolls when in its closest position but with the fabric specimen passing between, and means driven by the other two rolls to move the third roll away from them once during each half cycle of the machine, the tension of the fabric causing the third roll to return to said closest position after each movement away from the other two rolls.

16. The invention defined in claim 15, wherein there is a mechanism to stop the third roll from rotating as it separates from the other two rolls, said mechanism permitting the third roll to rotate in the reverse direction as soon as the fabric is moved in the reverse direction.

17. A tension, compression and shear-imposing device for testing fabrics comprising a roll-supporting frame, a support for said roll-supporting frame permitting gravity movement of the roll-supporting frame relative to the support, at least three rolls rotatably mounted on the roll-supporting frame to rotate about parallel axes, each of said rolls having corrugated peripheries, two of the rolls being mounted side by side but spaced apart and immovable on the roll-supporting frame except for their rotation, a third roll mounted on the roll-supporting frame so that it may contact the other two rolls with its corrugations in mesh with those of the other two rolls, slide bearings for the third roll permitting it to move away from and toward the other two rolls, the test fabric being frictionally engaged with all three rolls so as to be put under tension by the weight of the roll-supporting frame and the rolls thereon and so as to cause rotation of the rolls in opposite directions when the test fabric is reciprocated, and means operated by the rotating rolls to effect movement of the third roll away from and back into substantial contact wtih the other two rolls.

18. The invention defined in claim 17, wherein all the rolls are of the same diameter, means are provided on said other two rolls to compel the later rolls to rotate at the same speed in the same direction, and a mechanism also on the roll-supporting frame is actuated by the rotating third roll to effect stoppage of rotation thereof prior to the stoppage of rotation of the other two rolls due to the momentary pause at the end of each stroke of the reciprocating fabric, said stoppage of rotation of the third roll causing rubbing or abrasion of the fabric on the third roll as the fabric is reciprocated.

19. A device for testing fabrics comprising a roll-supporting frame, a support for said frame permitting gravity movement of the roll-supporting frame relative to the support, at least three rolls rotatably mounted on the roll-supporting frame to rotate about parallel axes, each of said rolls having corrugated peripheries, two of the rolls being mounted side by side but spaced apart and immovable on the roll-supporting frame except for their rotation, a third roll mounted on the roll-supporting frame so that it may be separated from or may contact the other two rolls with its corrugations in mesh with those of the other two rolls, the test fabric being frictionally engaged with all three rolls so as to be put under tension by the weight of the roll-supporting frame so as to cause rotation of the rolls in opposite directions when the test fabric is reciprocated, and means operated by the rotating rolls to effect separation and stoppage of rotation of the third roll during each half cycle of the machine prior to the stoppage of rotation of the other two rolls at the end of each stroke of the reciprocating fabric, said stoppage of rotation of the third roll causing rubbing or abrasion of the reciprocating fabric on the third roll.

20. In combination, a roll support, at least three rolls on the roll support and adapted to be frictionally engaged and rotated in opposite directions by a tensioned test strip of fabric which is reciprocated by a source of power, two of the rolls being parallel and having fixed bearings permitting free rotation but preventing any other movement, a third roll having slide bearings permitting it to move away from and toward the other two rolls, mechanism interposed between the two rolls and said third roll to cause the third roll to move away from the other two rolls once during each stroke of the reciprocating fabric, and means in part connected to the roll support and in part carried on the shaft of the third roll and acting as a brake to stop rotation of the third roll during that part of the cycle wherein it moves away from the other two rolls, the tensioned fabric continuing to move around the stopped third roll to the end of the stroke of the reciprocation.

21. Mechanism to effect starting and stopping of a rotatable roll having a shaft supported for rotation on a frame and rotated in opposite directions by frictional contact with a strip of test fabric which is reciprocated by a source of power; said mechanism comprising a member fixed to the shaft of the roll, said member having a dog, a clutch member loosely mounted on the same shaft and engageable by said dog as the shaft rotates in either direction, a stop member loose on said shaft but held against rotation and having a dog which the clutch member engages when the clutch member is rotated in either direction by its engagement with the member that is fixed to said shaft; said stop member bringing the clutch member to a complete stop and hence stopping the shaft through the intermediation of the member that is fixed to said shaft; reverse rotation of said roll causing immediate separation of the clutch member from the stop member, and the member that is fixed to the shaft rotating in the reverse direction until it engages the clutch member and moves the clutch member into contact with the stop member, whereupon the reverse rotation of the shaft and its roll is stopped; at least two additional rolls on said frame also rotated by frictional contact with said strip of test fabric; said additional rolls being out of contact with each other but at times substantially in contact with the first-mentioned roll; and means to effect movement of the first-mentioned roll away from the other two rolls prior to the moment when the first-mentioned roll is stopped.

22. The invention defined in claim 21, wherein said shaft carries cams fixed near each end, and the frame carries members against which the cams bear, so that the cams may effect separation of the first-mentioned roll from said additional rolls.

23. In combination, a shaft; a circumferential member fixed to the shaft and adapted to be rotated in opposite directions by frictional engagement of a power-reciprocated flexible element with its periphery; a non-rotating abutment member in which said shaft may rotate; a clutch member loosely carried on said shaft and adapted to strike the non-rotating abutment member after a partial rotation on the shaft axis; another member fixed to said shaft and adapted to strike the loose clutch member on opposite sides as said other member is rotated with the shaft in opposite directions; power actuated means adapted to reciprocate the flexible element to cause reverse rotation of the circumferential member and hence of its shaft and stoppage of rotation of the circumferential member each time the thrust of the member that is fixed to said shaft is transmitted through the loose clutch member to the non-rotating abutment member.

24. In combination, a power driven shaft, a shaft support, a fabric specimen-engaging roll fixed to said shaft, a member in which the shaft may rotate, said member being non-rotatable and having a dog providing an abutment or stop, another member loose on said shaft and having a part that is engageable with said dog, and a third member fixed to the shaft and having a part that is engageable with the member that is loose on the shaft; the angles subtended by the dog, the dog-engaging part of the loose member, and the loose-member-engaging part of the third member being such that the shaft may rotate one full revolution in either direction and then will stop due to the direct thrust imposed by the third member through the loose member upon the dog.

25. In combination, a power driven shaft that is rotated alternately in opposite directions; a shaft support; a member in which the shaft may rotate, said member being non-rotatable and having a dog providing an abutment or stop; another member loose on said shaft and having a part that may strike said dog; a third member fixed to the shaft and having a part that may strike opposite faces of said loosely mounted member; cams fixed to said driven shaft and adapted to move the driven shaft laterally; and members on the shaft support against which the cams bear, so that when the cams are rotated with the shaft they will move the shaft laterally a distance equal to the throw of the cams.

26. In combination, a roll support, at least three rolls having substantially parallel axes mounted on the roll support and adapted to be frictionally engaged and rotated in opposite directions by a tensioned test strip of fabric which is reciprocated by a source of power, two of the rolls being mounted in fixed bearings permitting free rotation but preventing any other movement; means to connect said two rolls so that they rotate in the same direction simultaneously; a shaft fixed to the third roll and projecting from both ends; slide bearings on the roll support for the third roll permitting it to move substantially vertically away from and toward the other two rolls; a pair of plates secured to the tops of said slide bearings, each plate having an aperture; circular members at opposite ends of the third roll through which the third roll shaft may rotate, said circular members each having a pin fixed thereto, each pin being slidably received in the aperture of the neighboring plate so that the circular members travel with the third roll; the plates acting to prevent the third roll from moving out of the fixed slide bearings; cam means interposed between the roll support and the third roll to cause the third roll to move away from the other two rolls once during each stroke of the test strip of fabric; and mechanism driven by the third roll for stopping its rotation after it has moved away from the other two rolls, said mechanism including said circular members, each of which has a dog acting as a stop for movement in opposite directions.

27. In combination, a roll support, at least three rolls having substantially parallel axes mounted on the roll support and adapted to be frictionally engaged and rotated in opposite directions by a tensioned test strip of fabric which is reciprocated by a source of power, two of the rolls being parallel and being mounted in fixed bearings permitting free rotation but preventing any other movement, slide bearings on the roll support for the third roll permitting it to move away from and toward the other two rolls; a pair of plates secured to the tops of said slide bearings, each plate having an aperture; a shaft or axle fixed to the third roll and projecting from both ends; circular stop members in which the shaft or axle may rotate, each stop member having a pin fixed thereto and projecting upwardly through the aperture of the adjacent plate and being slidable in said aperture; the circular stop members being thereby prevented from rotation with the third roll but traveling with the third roll; the plates acting to prevent the third roll from moving out of the slide bearings; eccentrics or cams secured to the ends of said shaft or axle; disks on the roll support against which the eccentrics or cams bear, so that the cams as they rotate will effect separation of the third roll from the first-mentioned pair of rolls and then return of the third roll to substantial contact with the first-mentioned pair of rolls; said circular stop members each having a dog; a clutch member loosely mounted on each end of said shaft or axle and having means adapted to strike opposite ends of said dog when the clutch member is rotated in opposite directions; and cylindrical driving members fixed to opposite ends of said shaft or axle, each cylindrical driving member having an arcuate dog projecting toward the adjacent clutch member and engageable therewith; power derived from the tensioned test strip of fabric being transmitted through the third roll to said shaft or axle and thence through the two cylindrical driving members to the clutch members which are thereby rotated into contact with the dogs on the adjacent stop members once during each stroke of the reciprocating test fabric, thereby stopping rotation of the third roll before the end of each such stroke, whereby the tensioned fabric is pulled around the stopped and cam-elevated third roll toward the end of each such stroke.

References Cited in the file of this patent

UNITED STATES PATENTS

| Number | Name | Date |
|---|---|---|
| 889,993 | Vaughan et al. | June 9, 1908 |
| 1,179,289 | Daglish et al. | Apr. 11, 1916 |
| 1,203,956 | Albanese | Nov. 7, 1916 |
| 1,954,483 | Krall | Apr. 10, 1934 |
| 1,961,726 | Abbott | June 5, 1934 |
| 2,078,259 | Magash | Apr. 27, 1937 |
| 2,519,551 | Cross | Aug. 22, 1950 |

FOREIGN PATENTS

| Number | Country | Date |
|---|---|---|
| 289,557 | Germany | Dec. 25, 1914 |